(12) United States Patent
Hirata et al.

(10) Patent No.: US 12,466,088 B2
(45) Date of Patent: Nov. 11, 2025

(54) BENDING STRUCTURAL BODY

(71) Applicant: NHK SPRING CO., LTD., Kanagawa (JP)

(72) Inventors: Takafumi Hirata, Kanagawa (JP); Yuki Hotoda, Kanagawa (JP); Yuki Hayakawa, Kanagawa (JP)

(73) Assignee: NHK SPRING CO., LTD., Kanagawa (JP)

( * ) Notice: Subject to any disclaimer, the term of this patent is extended or adjusted under 35 U.S.C. 154(b) by 14 days.

(21) Appl. No.: 18/279,881

(22) PCT Filed: Mar. 3, 2022

(86) PCT No.: PCT/JP2022/009091
§ 371 (c)(1),
(2) Date: Sep. 1, 2023

(87) PCT Pub. No.: WO2022/186327
PCT Pub. Date: Sep. 9, 2022

(65) Prior Publication Data
US 2025/0033230 A1    Jan. 30, 2025

(30) Foreign Application Priority Data

Mar. 5, 2021 (JP) ................. 2021-035244

(51) Int. Cl.
*B25J 18/00* (2006.01)
*B25J 17/00* (2006.01)
*B25J 18/06* (2006.01)

(52) U.S. Cl.
CPC .............. *B25J 18/06* (2013.01); *B25J 17/00* (2013.01)

(58) Field of Classification Search
CPC ... B25J 18/06; B25J 17/00; B25J 15/12; B25J 9/1635
See application file for complete search history.

(56) References Cited

U.S. PATENT DOCUMENTS 3,060,972 A * 10/1962 Sheldon ............... A61B 1/0055
138/120
3,266,059 A * 8/1966 Stelle ........................ B25J 9/06
138/131

(Continued)

FOREIGN PATENT DOCUMENTS

EP          3158911       4/2017
JP        2003126024      5/2003

(Continued)

OTHER PUBLICATIONS

"International Search Report (Form PCT/ISA/210) of PCT/JP2022/009091", mailed on May 24, 2022, with English translation thereof, pp. 1-6.

(Continued)

*Primary Examiner* — Zakaria Elahmadi
(74) *Attorney, Agent, or Firm* — JCIPRNET

(57) ABSTRACT

The present invention comprises: a first bending part and a second bending part which are capable of bending elastically; a connection part which connects the first bending part and the second bending part, and which has higher bending rigidity than the first bending part and the second bending part; and a plurality of first cord-like members which are attached to the first bending part, which are inserted through the first bending part, the connection part, and the second bending part, and which are capable of bending the first bending part via tension on the second bending part side. The first cord-like members each have a plurality of divided parts which are divided in the connection part and dispersed in the circumferential direction, and which are inserted through the second bending part in this dispersed state.

18 Claims, 9 Drawing Sheets

(56) References Cited

U.S. PATENT DOCUMENTS

| | | | |
|---|---|---|---|
| 8,365,633 B2* | 2/2013 | Simaan | A61B 90/50 606/1 |
| 9,539,726 B2* | 1/2017 | Simaan | A61B 34/35 |
| 11,576,740 B2* | 2/2023 | Kurokawa | A61B 17/29 |
| 2006/0156851 A1* | 7/2006 | Jacobsen | B25J 18/06 74/490.01 |
| 2008/0177282 A1* | 7/2008 | Lee | B25J 3/04 606/130 |
| 2012/0253131 A1* | 10/2012 | Malkowski | A61B 34/30 606/1 |
| 2013/0023859 A1* | 1/2013 | Malkowski | A61B 17/00234 606/1 |
| 2013/0090763 A1* | 4/2013 | Simaan | B25J 19/025 700/258 |
| 2013/0178838 A1* | 7/2013 | Malkowski | A61B 17/3421 606/1 |
| 2013/0255410 A1 | 10/2013 | Lee et al. | |
| 2014/0114293 A1 | 4/2014 | Jeong et al. | |
| 2014/0148759 A1 | 5/2014 | Macnamara et al. | |
| 2015/0122071 A1 | 5/2015 | Lee et al. | |
| 2015/0352728 A1 | 12/2015 | Wang | |
| 2018/0214226 A1* | 8/2018 | Kan | B25J 17/02 |
| 2019/0054640 A1* | 2/2019 | Piette | B25J 9/104 |
| 2021/0138197 A1* | 5/2021 | Malkowski | A61B 17/3421 |

FOREIGN PATENT DOCUMENTS

| | | |
|---|---|---|
| JP | 2016528946 | 9/2016 |
| JP | 2017512659 | 5/2017 |
| WO | 2020036081 | 2/2020 |

OTHER PUBLICATIONS

"Search Report of Europe Counterpart Application", issued on Jul. 31, 2024, p. 1-p. 9.

"Written Opinion of the International Searching Authority (Form PCT/ISA/237) of PCT/ JP2022/009091," mailed on May 24, 2022, with English translation thereof, pp. 1-8.

* cited by examiner

BENDING STRUCTURAL BODY

CROSS-REFERENCE TO RELATED APPLICATION

This application is a 371 application of the International PCT application serial no. PCT/JP2022/009091, filed on Mar. 3, 2022, which claims the priority benefits of Japan Patent Application No. 2021-035244, filed on Mar. 5, 2021. The entirety of each of the above-mentioned patent applications is hereby incorporated by reference herein and made a part of this specification.

TECHNICAL FIELD

The present invention relates to a bending structural body provided for joint function parts of robots, manipulators, and the like.

RELATED ART

There is a conventional bending structural body that has multiple joints as disclosed in Patent Literature 1, for example.

This bending structural body rotatably connects a plurality of bending pieces and connects an operation wire to the frontmost bending piece, and bends the whole body by pushing and pulling the operation wire.

Then, a repulsive force imparting means is provided on the base end side so that the bending piece starts to bend preferentially from the distal end side when a bending operation is performed by the operation wire.

However, in such a structure, the bending piece on the base end side also bends together with the bending piece on the distal end side, which is a factor that causes the operability to deteriorate.

CITATION LIST

Patent Literature

[Patent Literature 1] Japanese Patent Application Laid-Open No. 2003-126024

SUMMARY OF INVENTION

Technical Problem

The problem to be solved is the deterioration of the operability of the multi-joint bending structural body.

Solution to Problem

The present invention provides a bending structural body which includes a first bending part and a second bending part that are elastically bendable; a connection part connecting between the first bending part and the second bending part and having higher bending rigidity than the first bending part and the second bending part; and a plurality of first cord-like members attached to the first bending part and inserted through the first bending part, the connection part, and the second bending part, and being capable of bending the first bending part by pulling on the side of the second bending part. The plurality of first cord-like members each include a plurality of divided parts that are divided in the connection part and dispersed in a circumferential direction, and are inserted through the second bending part in a dispersed state.

In addition, the present invention provides a bending structural body which includes a first bending part and a second bending part that are elastically bendable; a connection part connecting between the first bending part and the second bending part and having higher bending rigidity than the first bending part and the second bending part; a plurality of first cord-like members attached to the first bending part and inserted through the first bending part, the connection part, and the second bending part, and being capable of bending the first bending part by pulling on the side of the second bending part; and a plurality of third cord-like members attached to the second bending part and inserted through the second bending part, and pulled together with the corresponding first cord-like member during bending of the first bending part to suppress bending of the second bending part.

Effects of Invention

According to the present invention, it is possible to suppress the bending of the second bending part even when the first bending part is bent, and it is possible to improve the operability of the multi-joint bending structural body.

Figure 1:
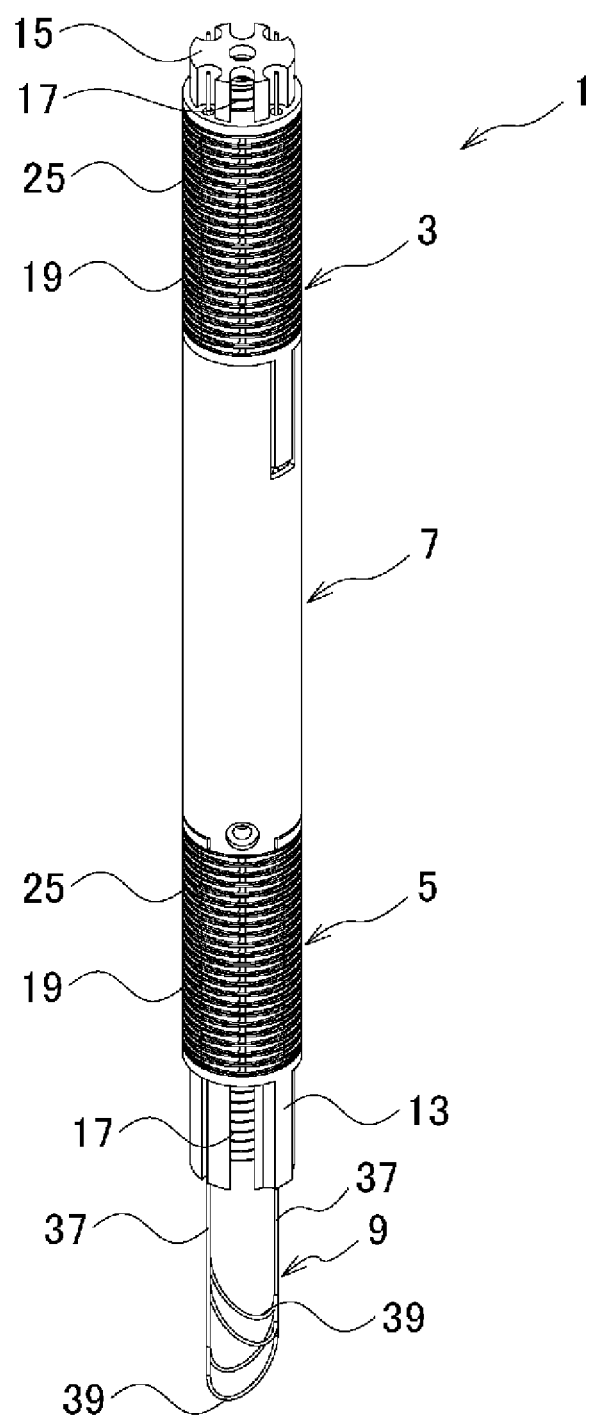
FIG. 1 is a perspective view showing the bending structural body according to the first embodiment of the present invention.
Figure 5:
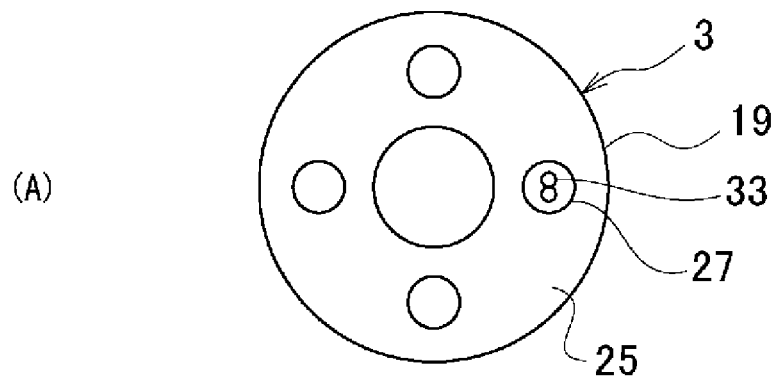
Figure 5:
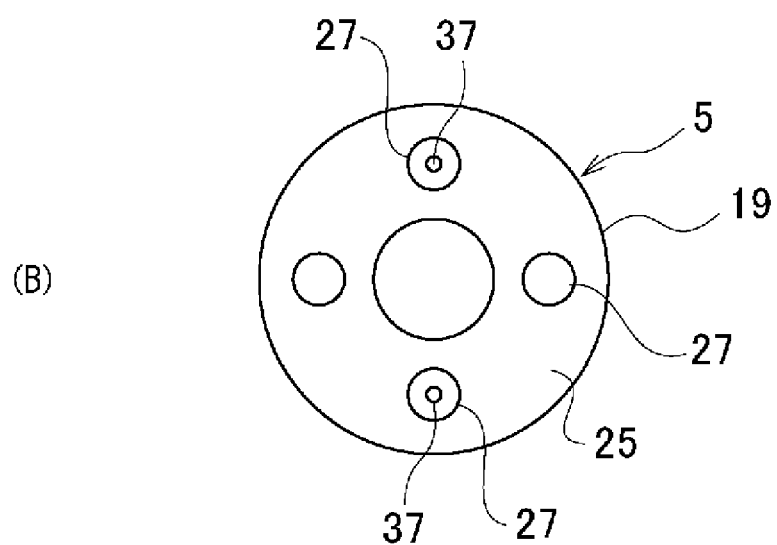

(A) and (B) of FIG. 5 are schematic diagrams respectively showing the insertion positions of the first cord-like members in the first bending part and the second bending part of the bending structural body of FIG. 1.

Figure 6:
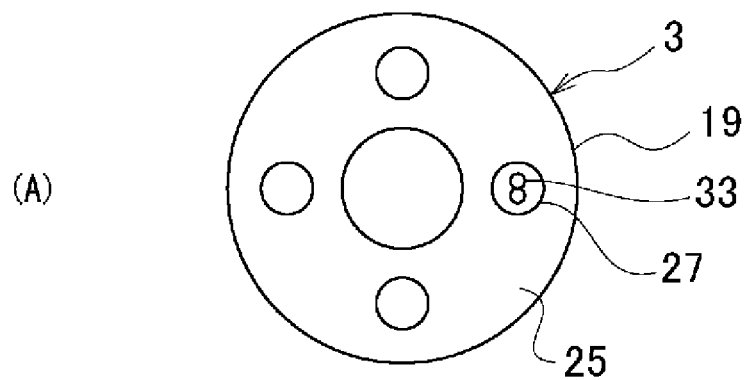
Figure 6:
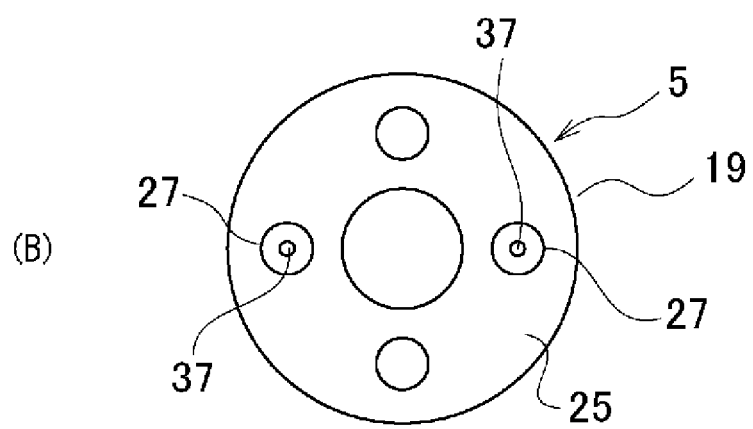

(A) and (B) of FIG. 6 are schematic diagrams respectively showing the insertion positions of the first cord-like members in the first bending part and the second bending part of the bending structural body according to a modified example.

Figure 7:
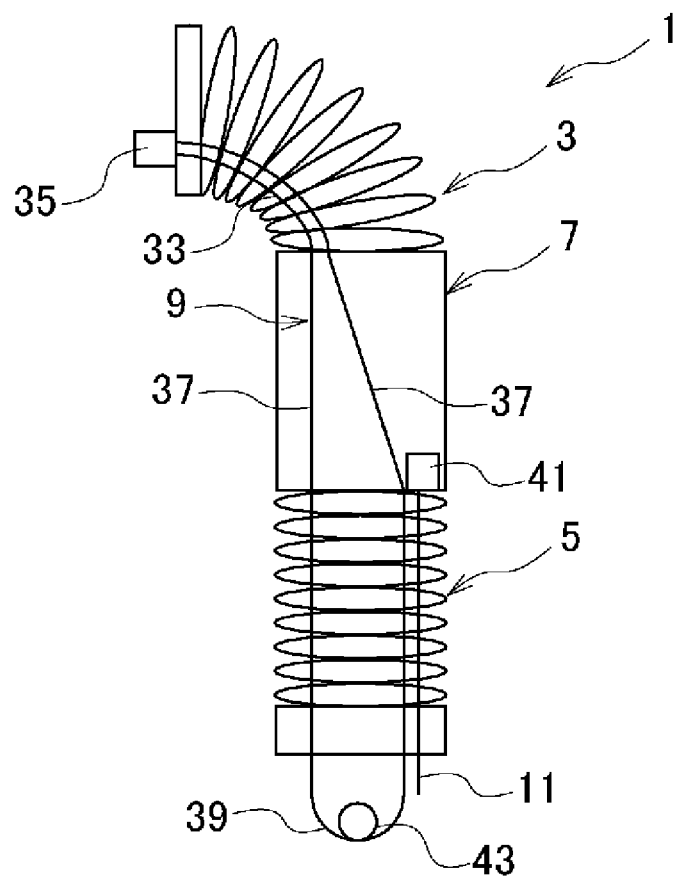

FIG. 7 is a conceptual diagram showing the bending of the first bending part.

Figure 8:
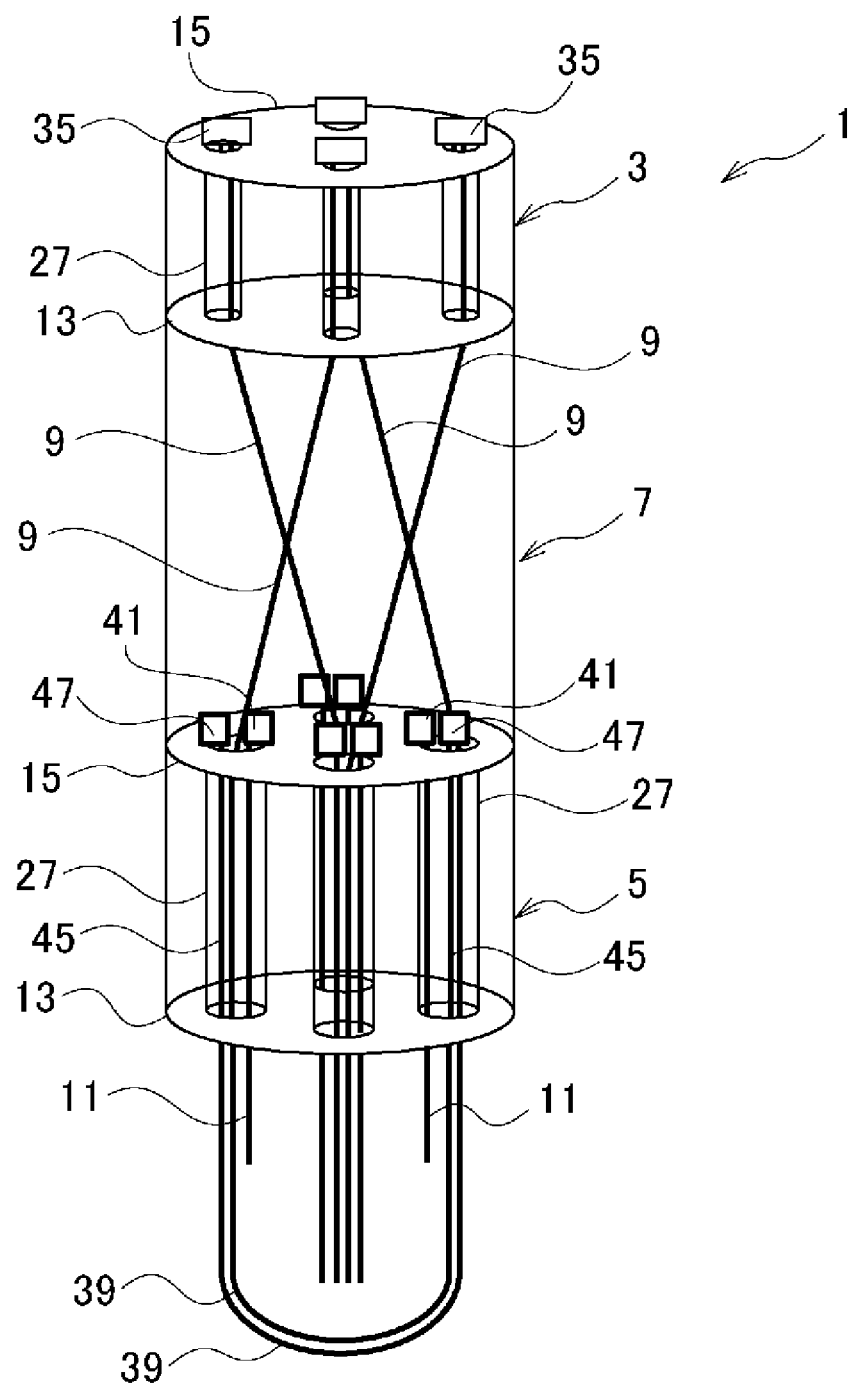

FIG. 8 is a conceptual diagram showing an inserted state of the first cord-like members, the second cord-like members, and the third cord-like members of the bending structural body according to the second embodiment of the present invention.

Figure 9:
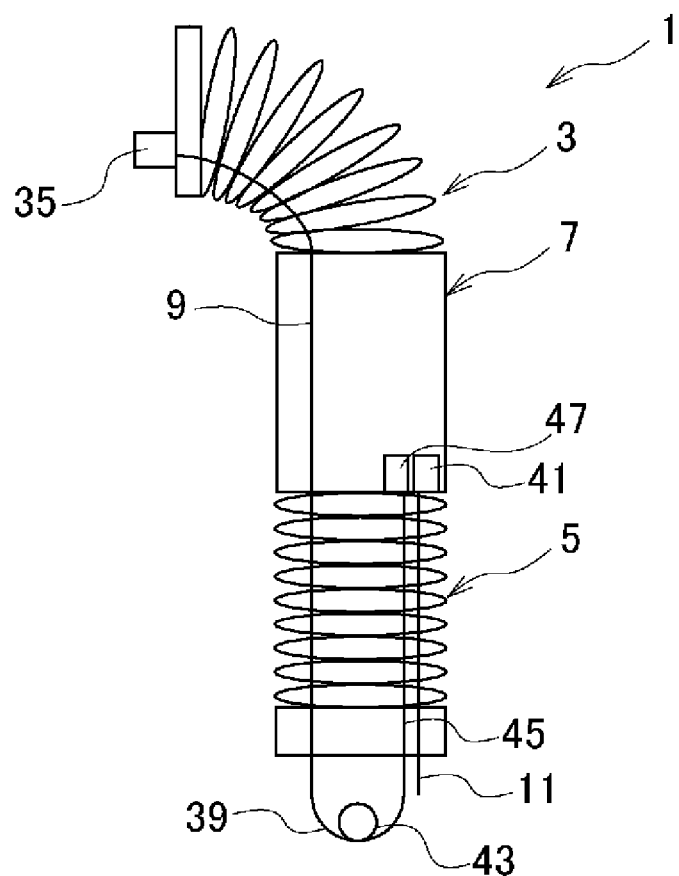

FIG. 9 is a conceptual diagram showing the bending of the first bending part.

DESCRIPTION OF EMBODIMENTS

The purpose of improving the operability in a multi-joint bending structural body is realized by inserting first cord-like members, which bend a first bending part by pulling, through a second bending part in a state where the first cord-like members are divided into a plurality of divided parts and dispersed in the circumferential direction.

That is, a bending structural body (1) includes a first bending part (3) and a second bending part (5), a connection part (7), and a plurality of first cord-like members (9). The first bending part (3) and the second bending part (5) are elastically bendable members. The connection part (7) is a member that connects between the first bending part (3) and the second bending part (5) and has higher bending rigidity than the first bending part (3) and the second bending part (5). The plurality of first cord-like members (9) are attached to the first bending part (3) and inserted through the first bending part (3), the connection part (7), and the second bending part (5), and are capable of bending the first bending part (3) by pulling on the side of the second bending part (5). The plurality of first cord-like members (9) each include a plurality of divided parts (37) which are divided in the connection part (7) and dispersed in the circumferential direction, and are inserted through the second bending part (5) in the dispersed state.

Preferably, the divided parts (37) are arranged at equal intervals in the circumferential direction when inserted through the second bending part (5). More preferably, an even number of divided parts (37) are provided for each first cord-like member (9), and the divided parts (37) are arranged symmetrically to each other with respect to the center of the second bending part (5) when inserted through the second bending part (5).

In addition, preferably, the divided parts (37) are displaced in the circumferential direction with respect to a main body part (33) of the first cord-like member (9) in the first bending part (3) when inserted through the second bending part (5). The displacement amount in the circumferential direction is preferably 90 degrees.

The divided parts (37) of the same first cord-like member (9) may be drawn out from the second bending part (5) for pulling, and the portions drawn out from the second bending part (5) may constitute loop-shaped loop parts (39) that are connected to each other.

In this case, the bending structural body (1) may include an operation part (43) for pulling the loop part (39), which is not fixed to the loop part (39).

A plurality of second cord-like members (11) are provided, which are attached to the second bending part (5) and inserted through the second bending part (5) and are capable of bending the second bending part (5) by pulling when an operation of bending the second bending part (5) is performed.

In this case, the divided parts (37) may be inserted through an insertion path of the second cord-like member (11) when inserted through the second bending part (5).

In addition, the bending structural body (1) may have a form in which the first cord-like member (9) does not have the divided parts (37). In this case, the bending structural body (1) includes third cord-like members (45).

The first cord-like member (9) is attached to the first bending part (3) and is inserted through the first bending part (3), the connection part (7), and the second bending part (5) without having the divided parts (37). This first cord-like member (9) is capable of bending the first bending part (3) by pulling on the side of the second bending part (5). The third cord-like member (45) is attached to the second bending part (5) and inserted through the second bending part (5), and is pulled together with the corresponding first cord-like member (9) during bending of the first bending part (3) to suppress bending of the second bending part (5).

Preferably, each first cord-like member (9) and the third cord-like member (45) corresponding to the first cord-like member (9) are positioned on opposite sides across the center of the second bending part (5) when inserted through the second bending part (5). More preferably, each first cord-like member (9) and the third cord-like member (45) corresponding to the first cord-like member (9) are arranged symmetrically to each other with respect to the center of the second bending part (5) when inserted through the second bending part (5).

Preferably, a portion of each first cord-like member (9), which is inserted through the second bending part (5), is displaced in the circumferential direction with respect to a portion inserted through the first bending part (3), and the third cord-like member (45) is displaced in the circumferential direction with respect to the corresponding first cord-like member (9) in the first bending part (3) when inserted through the second bending part (5). The displacement amount in the circumferential direction is preferably 90 degrees.

Each first cord-like member (9) and the third cord-like member (45) corresponding to the first cord-like member (9) may be drawn out from the second bending part (5) for pulling, and the portions drawn out from the second bending part (5) may constitute loop-shaped loop parts (39) that are connected to each other.

In this case, the bending structural body (1) may include an operation part (43) as described above.

In addition, even in a form that does not have the divided parts (37), the bending structural body (1) may include a plurality of second cord-like members (11).

In this case, the first cord-like member (9) and the third cord-like member (45) may be inserted through the insertion path of the second cord-like member (11) when inserted through the second bending part (5).

First Embodiment

[Bending Structural Body]

Figure 2:
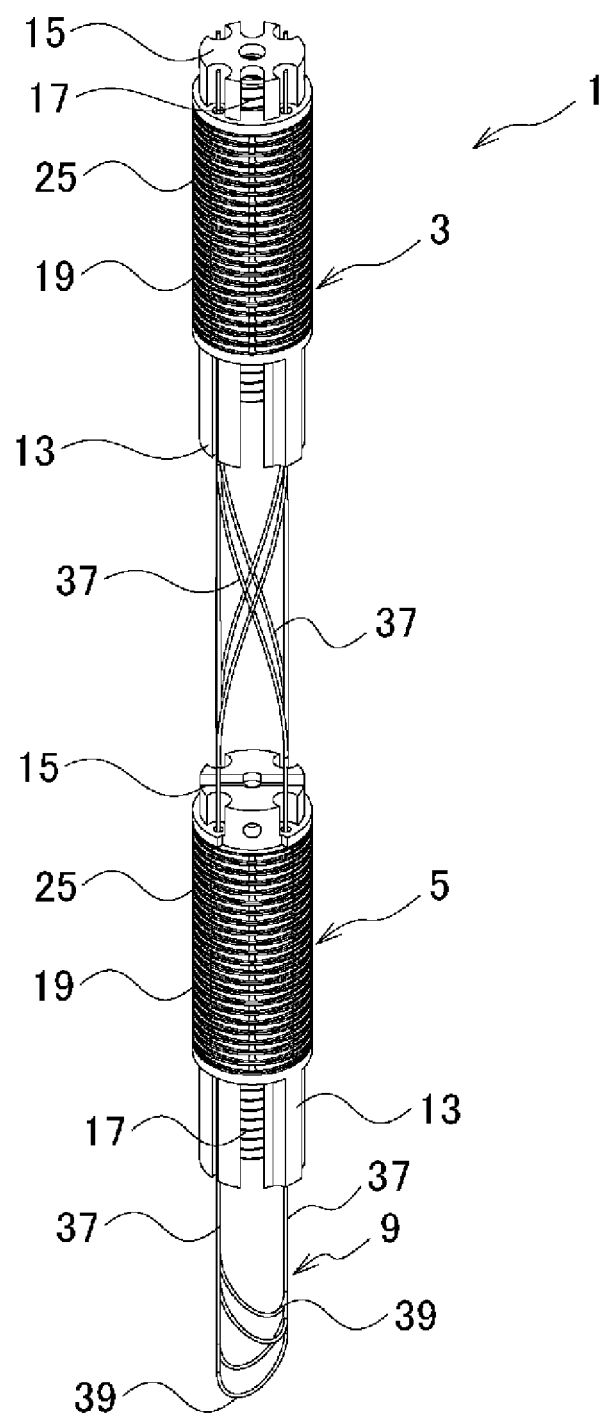
FIG. 2 is a perspective view with a part of the bending structural body of FIG. 1 omitted.
Figure 3:
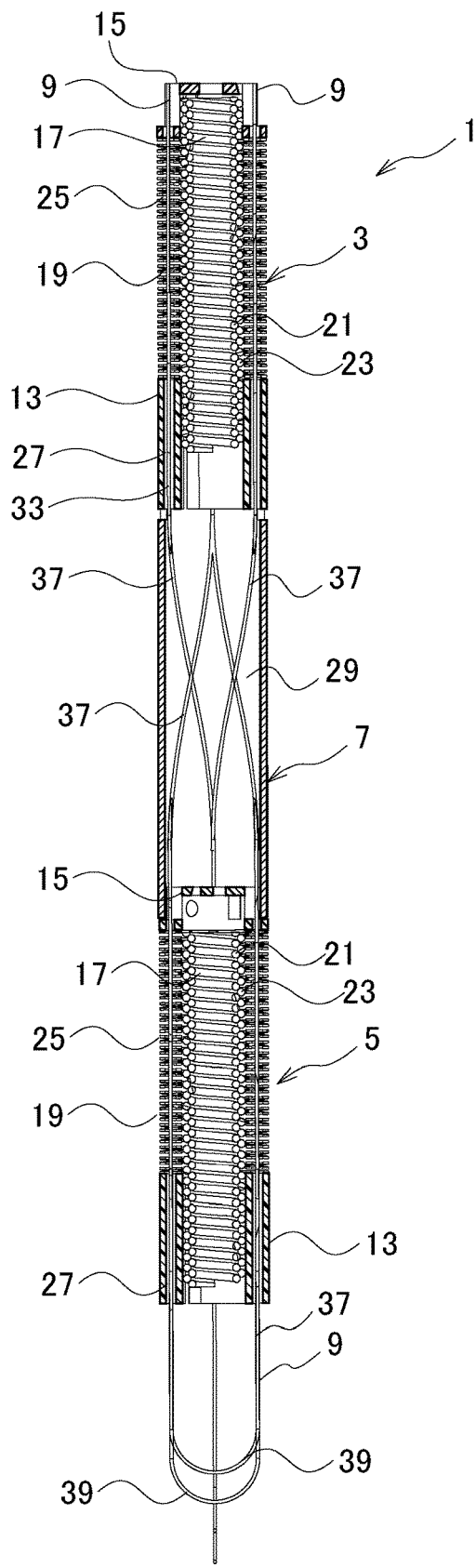
FIG. 3 is a longitudinal cross-sectional view of the bending structural body of FIG. 1.

FIG. 1 is a perspective view showing the bending structural body according to the first embodiment of the present invention. FIG. 2 is a perspective view with a part of the bending structural body omitted. FIG. 3 is a longitudinal cross-sectional view of the bending structural body. In FIG. 1 to FIG. 3, illustration of the second cord-like member is omitted.

The bending structural body 1 is applied to the joint function parts of various devices such as manipulators, robots, and actuators for medical and industrial purposes. The joint function parts are apparatuses, mechanisms, devices, or the like functioning as joints that bend and extend.

The bending structural body 1 of this embodiment has multiple joints, and includes a first bending part 3 and a second bending part 5, a connection part 7, and a plurality of first cord-like members 9 and second cord-like members 11.

The first bending part 3 and the second bending part 5 are members that are elastically bendable and extendable as joints. The bending and extension refer to bending and extension in a direction along the axis of the bending structural body 1 (hereinafter referred to as an axial direction). It should be noted that the axial direction does not need to be strictly along the axis of the bending structural body 1.

The first bending part 3 is the bending part on the distal end side among the bending parts connected to the connection part 7, and the second bending part 5 is the bending part on the base end side among the bending parts connected to the connection part 7. The bending structural body 1 may have three or more bending parts, and even in that case, the first bending part 3 is on the distal end side with respect to the connection part 7 and the second bending part 5 is on the base end side. The distal end and the base end are the distal end and the base end of the bending structural body 1 in the axial direction.

Preferably, the first bending part 3 and the second bending part 5 are members formed by stacking coil springs, bellows, and a plurality of wave washers, members with joint structures formed by stacking a plurality of units, or members that are bendable in all directions of 360 degrees in plan view, such as link mechanisms.

The first bending part 3 and the second bending part 5 of this embodiment each include a base portion 13, a movable portion 15, an inner cylinder 17, and an outer cylinder 19. Since the first bending part 3 and the second bending part 5 have basically the same configuration, only the first bending part 3 will be described. As for the second bending part 5, only the differences from the first bending part 3 will be described as necessary.

The base portion 13 is a columnar body, such as a circular columnar body, made of resin, metal, or the like. This base portion 13 is attached to one end of the connection part 7. The base portion 13 of the second bending part 5 is attached to the device side to which the bending structural body 1 is applied. The base portion 13 is not limited to a columnar body, and may be in an appropriate form according to the device to which the bending structural body 1 is applied.

Like the base portion 13, the movable portion 15 is a columnar body, such as a circular columnar body, made of resin, metal, or the like. An end effector or the like corresponding to the device to which the bending structural body 1 is applied is attached to the movable portion 15. The movable portion 15 of the second bending part 5 is attached to the other end of the connection part 7. Nevertheless, the movable portion 15 is in an appropriate form according to the device to which the bending structural body 1 is applied, and is not limited to a columnar body.

The movable portion 15 is supported by the base portion 13 to be displaceable in the axial direction by the inner cylinder 17 and the outer cylinder 19. One of the inner cylinder 17 and the outer cylinder 19 may be omitted.

The inner cylinder 17 is arranged along the axial direction. The inner cylinder 17 is a double coil that is elastically bendable and extendable in the axial direction, and includes an inner coil portion 21 and an outer coil portion 23. Nevertheless, the inner cylinder 17 may be configured by a single contact coil spring or the like instead of a double coil.

The inner coil portion 21 and the outer coil portion 23 are each made of metal, resin, or the like, and are elastic coil springs that are bendable in the axial direction. The inner coil portion 21 has a smaller center diameter than the outer coil portion 23 and is screwed into the outer coil portion 23.

The double-coil-shaped inner cylinder 17 as a whole is bendable in the axial direction, and the length of the axis is substantially constant before, after, and during bending. That is, when bent by an external force, the inner cylinder 17 contracts on the inner side of the bending and expands on the outer side of the bending, so that the length of the axis does not change compared to a state when the inner cylinder 17 is not bent. In addition, the inner cylinder 17 has a configuration in which the inner coil portion 21 and the outer coil portion 23 mutually restrict compression in the axial direction.

The outer cylinder 19 is a cylindrical body arranged concentrically with the inner cylinder 17 and covering the outer circumference of the inner cylinder 17. The outer cylinder 19 of this embodiment is configured by stacking a plurality of wave washers 25 in the axial direction. This outer cylinder 19 is bendable by elastic deformation of the wave washers 25.

Nevertheless, the outer cylinder 19 is not necessarily configured by stacking the wave washers 25, and may be configured by other flexible members. For example, the outer cylinder 19 may be configured by a bellows made of a tubular body having a corrugated cross section or a double coil similar to the inner cylinder 17.

The connection part 7 is a member that connects between the first bending part 3 and the second bending part 5 and has higher bending rigidity than the first bending part 3 and the second bending part 5. The bending rigidity refers to the rigidity against the bending of the first bending part 3 and the second bending part 5. The connection part 7 connects the first bending part 3 and the second bending part 5 to form one multi-joint member.

An appropriate member according to the device to which the bending structural body 1 is applied may be used as the connection part 7 as long as the member connects the first bending part 3 and the second bending part 5.

The connection part 7 of this embodiment is made of metal or the like in a hollow tubular shape, for example, a cylindrical shape. The base portion 13 of the first bending part 3 and the movable portion 15 of the second bending part 5 are connected to both ends of the connection part 7, respectively. The connection may be realized by an appropriate technique such as fitting, welding, or adhesion.

Figure 4:
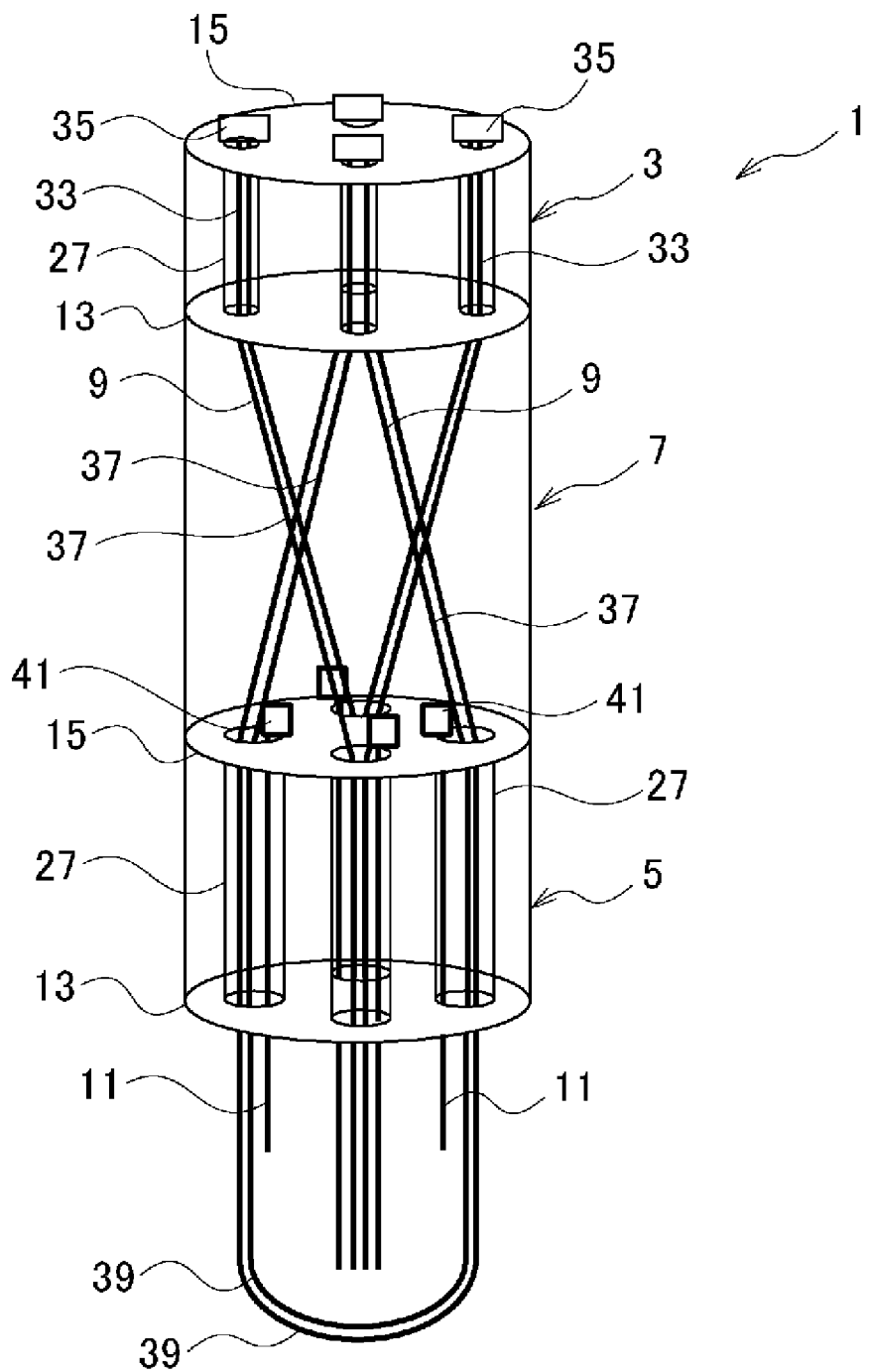
FIG. 4 is a conceptual diagram showing an inserted state of the first cord-like members and the second cord-like members of the bending structural body of FIG. 1.

FIG. 4 is a conceptual diagram showing an inserted state of the first cord-like members and the second cord-like members of the bending structural body. (A) and (B) of FIG. 5 are schematic diagrams respectively showing the insertion positions of the first cord-like members in the first bending part and the second bending part of the bending structural body.

A plurality of first cord-like members 9 are attached to the first bending part 3, and are capable of bending the first bending part 3 by pulling on the side of the second bending part 5. A plurality of second cord-like members 11 are attached to the second bending part 5, and are capable of bending the second bending part 5 by pulling.

The attachment position of the first cord-like member 9 to the first bending part 3 is preferably the end portion of the first bending part 3 on the distal end side, but may also be an intermediate portion or the like between the end portions according to the device or the like to which the bending structural body 1 is applied.

The attachment position of the second cord-like member 11 to the second bending part 5 is also preferably the end portion on the distal end side, but may also be the intermediate portion or the like between the end portions according to the device or the like to which the bending structural body 1 is applied.

Four first cord-like members 9 and four second cord-like members 11 are provided every 90 degrees in the circumferential direction, which makes it possible to bend the first bending part 3 and the second bending part 5 in all directions of 360 degrees in plan view. Nevertheless, the number of the first cord-like members 9 and the number of the second cord-like members 11 may be three or the like.

Appropriate members such as wires, single wires, twisted wires, piano wires, articulated rods, chains, cords, strings, and ropes may be used as the first cord-like members 9 and the second cord-like members 11 as long as the members are cord-like bodies that are capable of pulling the first bending part 3 and the second bending part 5. Similarly, materials such as stainless steel, NiTi (nickel titanium), carbon steel, and other metals may be used as appropriate.

The plurality of first cord-like members 9 are respectively inserted through the first bending part 3, the connection part 7, and the second bending part 5, and are drawn out from the second bending part 5 for pulling. The insertion is performed through insertion holes 27 provided over the movable portion 15, the outer cylinder 19, and the base portion 13 in the first bending part 3 and the second bending part 5, and is performed through an inner space 29 in the connection part 7. The drawing out means to draw out from at least the bending range of the second bending part 5. The bending range refers to a range in which a bending action is performed, and is between the base portion 13 and the movable portion 15 in this embodiment. The first cord-like members 9 of this embodiment are drawn out of the second bending part 5.

The first cord-like member 9 of this embodiment is loop-shaped by folding one cord-like body. It should be noted that the first cord-like member 9 may be configured by a plurality of separate cord-like bodies.

In the first bending part 3, the main body part 33 of the first cord-like member 9 is formed as one piece by bundling both end portions of the folded cord-like body. The main body part 33 of the first cord-like member 9 is inserted through the inside of the first bending part 3 with the cord-like body bundled. In the main body part 33, the bundled cord-like body may be parallel to each other or may be twisted.

The end portions of the bundled cord-like body are joined together by a caulking part 35 made of a sleeve or the like. The caulking part 35 is engaged with the movable portion 15 of the first bending part 3, and the first cord-like member 9 is attached to the first bending part 3.

The first cord-like member 9 includes divided parts 37, in which the bundled cord-like body is divided and dispersed in the circumferential direction, within the connection part 7. The divided parts 37 are inserted through the second bending part 5 in a dispersed state. The dispersion of the divided parts 37 means a state where the divided parts 37 are scattered in the circumferential direction and means that the divided parts 37 are not unevenly distributed.

It is preferable to scatter the divided parts 37 in the circumferential direction by arranging the divided parts 37 at equal intervals in the circumferential direction when inserted through the second bending part 5. More preferably, two (an even number) divided parts 37 are provided as in this embodiment, and are arranged symmetrically to each other with respect to the center of the second bending part 5 when inserted through the second bending part 5. It should be noted that the divided parts 37 may be arranged symmetrically to each other with respect to the center of the second bending part 5 as long as the number of the divided parts 37 is even.

However, the number of the divided parts 37 may be an odd number such as three. When the number of the divided parts 37 is an odd number, the divided parts 37 are arranged at equal intervals in the circumferential direction when inserted through the second bending part 5.

Furthermore, the divided part 37 of this embodiment is displaced in the circumferential direction with respect to the main body part 33 of the first cord-like member 9 in the first bending part 3 when inserted through the second bending part 5. The divided part 37 is displaced from the main body part 33 so that there is no overlapping portion between the main body part 33 and the divided part 37 at least in the axial direction. In this embodiment, the divided part 37 is displaced from the main body part 33 by 90 degrees in the circumferential direction.

As shown in (A) and (B) of FIG. 6, one of the divided parts 37 may coincide with the main body part 33 without being displaced in the circumferential direction when inserted through the second bending part 5. (A) and (B) of FIG. 6 are schematic diagrams respectively showing the insertion positions of the first cord-like members 9 in the first bending part 3 and the second bending part 5 of the bending structural body 1 according to a modified example.

In addition, the portions of the divided parts 37 of this embodiment, which are drawn out from the second bending part 5, form loop-shaped loop parts 39 that are connected to each other. The loop part 39 is composed of the vicinity of the intermediate portion of one single loop-shaped first cord-like member 9 as a whole. It should be noted that the portions of the divided parts 37, which are drawn out from the second bending part 5, may be separated from each other without forming a loop shape.

Each of the plurality of second cord-like members 11 is configured by one cord-like body. The second cord-like member 11 has a caulking part 41, made of a sleeve or the like, formed at the end portion on the distal end side. The caulking part 41 is engaged with the movable portion 15 of the second bending part 5, and the second cord-like member 11 is attached to the second bending part 5.

The second cord-like member 11 is inserted through the second bending part 5 and drawn out from the second bending part 5 for pulling. The portions of the second cord-like members 11, which are drawn out from the second bending part 5, are separated from each other without forming a loop shape.

In the case of having three or more joints, since the second bending part 5 becomes a first bending part with respect to the bending part on the base end side, preferably, the second cord-like member 11 has divided parts 37 and is loop-shaped.

The insertion of the second cord-like member 11 is performed through the insertion hole 27 of the second bending part 5 in a manner similar to the divided part 37 of the first cord-like member 9.

Thus, the insertion of the divided part 37 in the second bending part 5 is performed through the insertion path of the second cord-like member 11. However, the insertion path for the divided part 37 may be secured separately in the second bending part 5.

Besides, the bending structural body 1 may also be applied to a mode in which the second bending part 5 is not operated, and in this case, the plurality of second cord-like members 11 are omitted.

[Operation]

FIG. 7 is a conceptual diagram showing the bending of the first bending part 3. In FIG. 7, only one single first cord-like member 9 and one single second cord-like member 11 are shown for easy understanding.

For the bending structural body 1 of this embodiment, the operator is able to bend the first bending part 3 in any direction of 360 degrees by pulling any one or more of first cord-like members 9.

When the first cord-like member 9 is pulled, the loop part 39 is pulled as shown in FIG. 7. At this time, it is assumed that the operation part 43 for pulling the loop part 39 is configured by a pulley or a member that is slidable on the loop part 39 and is not fixed to the loop part 39.

Thus, the bending structural body 1 is configured to include the operation part 43 for pulling the loop part 39, which is not fixed to the loop part 39. "Being not fixed" means that the operation part 43 is not fixed to a specific portion of the loop part 39, and the portion of the loop part 39 pulled by the operation part 43 is displaceable. In addition, in the case where the divided parts 37 of the first cord-like member 9 are separated, these divided parts 37 may be pulled synchronously.

As a result, it is possible to pull the plurality of divided parts 37 together, and it is possible to pull the center of the loop-shaped first cord-like member 9 as a whole. Thus, it is possible to bend the first bending part 3 smoothly and reliably without causing an uneven pulling force on any of the divided parts 37.

At this time, the divided parts 37 of the first cord-like member 9 passing through the second bending part 5 are arranged symmetrically to each other with respect to the center of the second bending part 5, so the divided parts 37 are opposed to each other to maintain the balance. Thereby, the bending of the second bending part 5 is suppressed. The suppression of bending of the second bending part 5 includes not only the case of preventing the bending of the second bending part 5 but also the case where the second bending part 5 bends to an allowable level.

Moreover, the divided part 37 is displaced from the main body part 33 by 90 degrees in the circumferential direction. Thus, the divided part 37 is arranged on the extension line of the neutral axis of bending of the first bending part 3, making it possible to suppress the influence of the bending of the first bending part 3 on the second bending part 5.

Further, the first cord-like member 9 is not coaxially pulled from the first bending part 3 to the second bending part 5 due to the displacement of the divided part 37. Thus, the bending of the second bending part 5 is more reliably suppressed.

Accordingly, in this embodiment, it is possible to bend only the first bending part 3 by simply pulling the first cord-like member 9. Thus, it is not necessary to suppress the bending of the second bending part 5 separately, and it is possible to simplify the bending operation, reduce the load during the bending operation, and achieve load reduction for the second bending part 5.

Furthermore, the operator is able to bend only the second bending part 5 in any direction of 360 degrees by pulling one or more of the second cord-like members 11.

Thus, with the bending structural body 1 of this embodiment, it is possible to pull the first bending part 3 and the second bending part 5 independently by pulling the first cord-like member 9 and the second cord-like member 11, and to improve the operability as a whole.

Effects of the First Embodiment

As described above, this embodiment includes the first bending part 3 and the second bending part 5 that are elastically bendable, the connection part 7 that connects between the first bending part 3 and the second bending part 5 and has higher bending rigidity than the first bending part 3 and the second bending part 5, and the plurality of first cord-like members 9 that are attached to the first bending part 3 and inserted through the first bending part 3, the connection part 7, and the second bending part 5, and are capable of bending the first bending part 3 by pulling on the side of the second bending part 5.

The plurality of first cord-like members 9 each include the plurality of divided parts 37 that are divided in the connection part 7 and dispersed in the circumferential direction, and are inserted through the second bending part 5 in the dispersed state.

Thus, when the first cord-like member 9 is pulled to bend the first bending part 3, the divided parts 37 inserted through the second bending part 5 are dispersed in the circumferential direction to maintain the balance or disperse the pulling force that causes the second bending part 5 to bend, so the bending of the second bending part 5 is suppressed.

Thus, it is possible to suppress the bending of the second bending part 5 even when the first bending part 3 is bent, and to improve the operability of the multi-joint bending structural body 1.

Moreover, since it is possible to bend the first bending part 3 while suppressing the bending of the second bending part 5 by simply pulling the first cord-like member 9, it is unnecessary to separately suppress the bending of the second bending part 5. Accordingly, in this embodiment, it is possible to simplify the bending operation, reduce the load during the bending operation, and reduce the load acting on the second bending part 5.

Since the divided parts 37 are arranged at equal intervals in the circumferential direction, it is possible to reliably maintain the balance during the bending of the first bending part 3, and to reliably suppress the bending of the second bending part 5.

In addition, in this embodiment, two divided parts 37 are provided for each first cord-like member 9, and the divided parts 37 are arranged symmetrically to each other with respect to the center of the second bending part 5 when inserted through the second bending part 5.

Thus, the divided parts 37 are capable of more reliably maintaining the balance and more reliably suppressing the bending of the second bending part 5.

Furthermore, the divided part 37 of this embodiment is displaced in the circumferential direction with respect to the main body part 33 of the first cord-like member 9 in the first bending part 3 when inserted through the second bending part 5.

Thus, the first cord-like member 9 is not pulled coaxially from the first bending part 3 to the second bending part 5, and the bending of the second bending part 5 is suppressed more reliably.

In this embodiment, the divided part 37 is displaced by 90 degrees in the circumferential direction with respect to the main body part 33 when inserted through the second bending part 5, so the divided part 37 is arranged on the extension line of the neutral axis of the first bending part 3. Thus, it is possible to suppress the influence of the bending of the first bending part 3 on the second bending part 5, and to suppress the bending of the second bending part 5 more reliably.

The divided parts 37 are drawn out from the second bending part 5 for pulling, and the portions drawn out from the second bending part 5 have the loop-shaped loop parts 39 that are connected to each other. Thus, by pulling the loop part 39, it is possible to pull the divided parts 37 together, and it is possible to pull the center of the first cord-like member 9.

Accordingly, it is possible to bend the first bending part 3 smoothly and reliably without causing an uneven pulling force on any of the divided parts 37.

The bending structural body 1 of this embodiment includes the plurality of second cord-like members 11 that are attached to the second bending part 5 and inserted through the second bending part 5, and are capable of bending the second bending part 5 by pulling.

Accordingly, it is possible to bend the first bending part 3 and the second bending part 5 independently, and to further improve the operability of the bending structural body 1.

Since the divided part 37 is inserted through the insertion hole 27, which is the insertion path of the second cord-like member 11, in the second bending part 5, it is possible to simplify the structure.

Since the bending structural body 1 includes the operation part 43 for pulling the loop part 39, which is not fixed to the loop part 39, it is possible to pull the center of the first cord-like member 9 easily and reliably.

Second Embodiment

FIG. 8 is a conceptual diagram showing the inserted state of the first cord-like members, the second cord-like members, and the third cord-like members of the bending structural body according to the second embodiment of the present invention. In the second embodiment, the same reference numerals are given to the configurations corresponding to those in the first embodiment, and redundant descriptions are omitted.

The bending structural body 1 of this embodiment includes third cord-like members 45 but each of the first cord-like members 9 does not have the divided parts 37. The other configurations are the same as the first embodiment.

The first cord-like member 9 and the third cord-like member 45 are composed of one cord-like body constituted mutually in one. In this cord-like body, one end side is the first cord-like member 9 and the other end side is the third cord-like member 45. It should be noted that the first cord-like member 9 and the third cord-like member 45 may also be configured by mutually separated cord-like bodies.

The first cord-like member 9 has one end attached to the first bending part 3, and is inserted through the first bending part 3, the connection part 7, and the second bending part 5. The first cord-like member 9 is attached to the first bending part 3 in the same manner as in the first embodiment.

The insertion of the first cord-like member 9 is performed in the same manner as in the first embodiment, and the first cord-like member 9 is inserted through the insertion path of the second cord-like member 11 when inserted through the second bending part 5.

The other end of the first cord-like member 9 is drawn out from the second bending part 5.

The third cord-like member 45 has one end attached to the second bending part 5, and is inserted through the second bending part 5. The third cord-like member 45 is inserted through the insertion path of the second cord-like member 11 in the same manner as the first cord-like member 9.

The attachment of the third cord-like member 45 to the second bending part 5 is performed by engaging a caulking part 47, which is made of a sleeve or the like and formed at one end of the third cord-like member 45, with the movable portion 15 of the second bending part 5. The other end of the third cord-like member 45 is drawn out from the second bending part 5.

The other end of the first cord-like member 9 and the other end of the third cord-like member 45, which are the portions drawn out from the second bending part 5, constitute loop-shaped loop parts 39 that are connected to each other.

With such a configuration, the third cord-like member 45 is pulled together with the corresponding first cord-like member 9 when the first bending part 3 is bent, thereby suppressing the bending of the second bending part 5. "Corresponding" means being associated in order to suppress the bending of the second bending part 5. In this embodiment, the mutually integral first cord-like member 9 and third cord-like member 45 correspond to each other.

The first cord-like member 9 and the third cord-like member 45 are pulled by pulling the loop part 39 with the unfixed operation part 43 (see FIG. 9). If the first cord-like member 9 and the third cord-like member 45 are separated, the first cord-like member 9 and the third cord-like member 45 may be synchronously pulled separately.

Each first cord-like member 9 and the third cord-like member 45 corresponding to the first cord-like member 9 are positioned on the opposite sides across the center of the second bending part 5 when inserted through the second bending part 5. In this embodiment, each first cord-like member 9 and the third cord-like member 45 corresponding to the first cord-like member 9 are arranged symmetrically to each other with respect to the center of the second bending part 5 when inserted through the second bending part 5.

Nevertheless, each first cord-like member 9 and the third cord-like member 45 corresponding to the first cord-like member 9 may not be symmetrical with respect to the center of the second bending part 5 if the third cord-like member 45 is capable of suppressing the bending of the second bending part 5.

The portion of each first cord-like member 9, which is inserted through the second bending part 5, is displaced in the circumferential direction with respect to the portion inserted through the first bending part 3. Each third cord-like member 45 is displaced in the circumferential direction with respect to the corresponding first cord-like member 9 in the first bending part 3 when inserted through the second bending part 5.

The displacement in the circumferential direction here is performed so that there is no overlapping portion at least in the axial direction, similar to the displacement of the divided part 37 in the circumferential direction in the first embodiment. In this embodiment, the displacement amount in the circumferential direction is 90 degrees.

FIG. 9 is a conceptual diagram showing the bending of the first bending part 3. In FIG. 9, only one single first cord-like member 9 and third cord-like member 45 and one single second cord-like member 11 are shown for easy understanding.

As shown in FIG. 9, when the loop part 39 is pulled by the operation part 43, the first bending part 3 is bent by the first cord-like member 9. At this time, the second bending part 5 is also about to bend due to the pulling of the first cord-like member 9, but the bending of the second bending part 5 is suppressed by the pulling of the third cord-like member 45.

Since in this embodiment the first cord-like member 9 and the third cord-like member 45 inserted through the second bending part 5 are arranged symmetrically to each other with respect to the center of the second bending part 5, the first cord-like member 9 and the third cord-like member 45 are opposed to each other to maintain the balance as in the first embodiment, which reliably suppresses the bending of the second bending part 5.

Moreover, since the first cord-like member 9 and the third cord-like member 45 are displaced from the first cord-like member 9 in the first bending part 3 by 90 degrees in the circumferential direction, it is possible to suppress the influence of the bending of the first bending part 3 on the second bending part 5 as in the first embodiment.

Thus, in this embodiment, it is also possible to bend only the first bending part 3 by simply pulling the first cord-like member 9 and the third cord-like member 45. Thus, it is not necessary to suppress the bending of the second bending part 5 separately, and it is possible to simplify the bending operation, reduce the load during the bending operation, and achieve load reduction for the second bending part 5.

In particular, in this embodiment, by simply attaching the end portions of the first cord-like member 9 and the third cord-like member 45 composed of one cord-like body to the first bending part 3 and the second bending part 5, it is not necessary to suppress the bending of the second bending part 5 separately, so it is possible to simplify the structure.

In addition, the second embodiment also achieves the same effects as the first embodiment.

What is claimed is:

1. A bending structural body, comprising:
a first bending part and a second bending part that are elastically bendable;
a connection part connecting between the first bending part and the second bending part and having higher bending rigidity than the first bending part and the second bending part; and
a plurality of first cord-like members attached to the first bending part and inserted through the first bending part, the connection part, and the second bending part, and being capable of bending the first bending part by pulling on the side of the second bending part,
wherein each of the plurality of first cord-like members comprises a plurality of divided parts that include a first divided part and a second divided part, wherein the first divided part and the second divided part of each of the plurality of first cord-like members are divided at the connection part and dispersed in a circumferential direction, and the first divided part and the second divided part are inserted through the second bending part in a dispersed state,
wherein the divided parts of the same first cord-like member are drawn out from the second bending part for the pulling, and portions drawn out from the second bending part constitute loop-shaped loop parts that are connected to each other.

2. The bending structural body according to claim 1, wherein the first divided part and the second divided part of each of the plurality of first cord-like members are arranged at equal intervals in the circumferential direction when inserted through the second bending part in the dispersed state.

3. The bending structural body according to claim 1, wherein an even number of the divided parts are provided for each of the first cord-like members, and the plurality of first cord-like members are arranged symmetrically to each other with respect to a center of the second bending part when inserted through the second bending part.

4. The bending structural body according to claim 1, wherein the divided parts of each of the plurality of first cord-like members are displaced in the circumferential direction with respect to main body parts of the first cord-like members in the first bending part when inserted through the second bending part.

5. The bending structural body according to claim 4, wherein a displacement amount in the circumferential direction between the first divided part and the second divided part of each of the plurality of first cord-like members is 90 degrees.

6. The bending structural body according to claim 1, comprising a plurality of second cord-like members attached to the second bending part and inserted through the second bending part, and being capable of bending the second bending part by pulling.

7. The bending structural body according to claim 6, wherein the divided parts are inserted through insertion paths of the second cord-like members when inserted through the second bending part.

8. A bending structural body, comprising:
a first bending part and a second bending part that are elastically bendable;
a connection part connecting between the first bending part and the second bending part and having higher bending rigidity than the first bending part and the second bending part;
a plurality of first cord-like members attached to the first bending part and inserted through the first bending part, the connection part, and the second bending part, and being capable of bending the first bending part by pulling on the side of the second bending part; and
a plurality of second cord-like members comprising a first second cord-like member and a second cord-like member each attached to the second bending part and inserted through the second bending part, and pulled together with the corresponding first cord-like member during bending of the first bending part to suppress bending of the second bending part,
wherein each of the first cord-like members and the second cord-like member corresponding to the first cord-like member are drawn out from the second bending part for the pulling, and portions drawn out from the second bending part constitute loop-shaped loop parts that are connected to each other.

9. The bending structural body according to claim 8, wherein each of the first cord-like members and the second cord-like member corresponding to the first cord-like member are positioned on opposite sides across a center of the second bending part when inserted through the second bending part.

10. The bending structural body according to claim 9, wherein each of the first cord-like members and the second cord-like member corresponding to the first cord-like member are arranged symmetrically to each other with respect to the center of the second bending part when inserted through the second bending part.

11. The bending structural body according to claim 8, wherein a portion of each of the first cord-like members, which is inserted through the second bending part, is displaced in a circumferential direction with respect to a portion inserted through the first bending part, and
the second cord-like member is displaced in the circumferential direction with respect to the corresponding first cord-like member in the first bending part when inserted through the second bending part.

12. The bending structural body according to claim 11, wherein a displacement amount in the circumferential direction is 90 degrees.

13. The bending structural body according to claim 8, comprising a plurality of second cord-like members attached to the second bending part and inserted through the second bending part, and being capable of bending the second bending part by pulling.

14. The bending structural body according to claim 13, wherein the first cord-like members and the second cord-like members are inserted through insertion paths of the second cord-like members when inserted through the second bending part.

15. The bending structural body according to claim 1, comprising an operation part for pulling the loop part, which is not fixed to the loop part.

16. The bending structural body according to claim 8, comprising an operation part for pulling the loop part, which is not fixed to the loop part.

17. A bending structural body, comprising:
a first bending part and a second bending part that are elastically bendable;
a connection part connecting between the first bending part and the second bending part and having higher bending rigidity than the first bending part and the second bending part; and
a plurality of first cord-like members attached to the first bending part and inserted through the first bending part, the connection part, and the second bending part, and being capable of bending the first bending part by pulling on the side of the second bending part,
wherein each of the plurality of first cord-like members comprises a plurality of divided parts that include a first divided part and a second divided part, wherein the first divided part and the second divided part of each of the plurality of first cord-like members are divided at the connection part and dispersed in a circumferential direction, and the first divided part and the second divided part are inserted through the second bending part in a dispersed state,
wherein the first divided part and the second divided part of one of the plurality of first cord-like members are inserted through a first insertion hole of the first bending part, and the first divided part of the one of the plurality of first cord-like members is inserted through a second insertion hole in the second bending part, and the second divided part of the one of the plurality of first cord-like members is inserted through a third insertion hole in the second bending part,
wherein the first divided part and the second divided part of another of the plurality of first cord-like members are inserted through a fourth insertion hole of the first bending part, and the first divided part of the another of the plurality of first cord-like members is inserted through the second insertion hole in the second bending part, and the second divided part of the another of the plurality of first cord-like members is inserted through the third insertion hole in the second bending part.

18. A bending structural body, comprising:
a first bending part and a second bending part that are elastically bendable;
a connection part connecting between the first bending part and the second bending part and having higher bending rigidity than the first bending part and the second bending part;
a plurality of first cord-like members attached to the first bending part and inserted through the first bending part, the connection part, and the second bending part, and being capable of bending the first bending part by pulling on the side of the second bending part; and
a plurality of third cord-like members comprising a first third cord-like member and a second third cord-like member each attached to the second bending part and inserted through the second bending part, and pulled together with the corresponding first cord-like member during bending of the first bending part to suppress bending of the second bending part,
wherein one of the plurality of first cord-like members is inserted through a first insertion hole of the first bending part, and the one of the plurality of first cord-like members is inserted through a second insertion hole in the second bending part,
wherein another of the plurality of first cord-like members is inserted through a third insertion hole of the first bending part, and the another of the plurality of first cord-like members is inserted through a fourth insertion hole in the second bending part.

* * * * *